2,919,286

4-HYDROXYPROGESTERONE AND ESTERS THEREOF

Harold Levy and Morton L. Mednick, Worcester, Mass., assignors, by mesne assignments, to G. D. Searle & Co., Skokie, Ill., a corporation of Delaware No Drawing. Application May 13, 1955
Serial No. 508,292

3 Claims. (Cl. 260—397.4)

The present invention relates to 4-hydroxyprogesterone and its lower alkanoic acid esters. The chemical compounds which comprise this invention can be represented by the structural formula

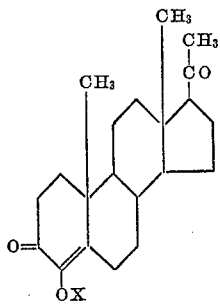

wherein X is a member of the class consisting of hydrogen and acyl radicals derived from lower alkanoic acids containing from 1 to 8 carbon atoms. The acyl radicals which X can represent accordingly include formyl, acetyl, propionyl, butyryl, valeryl, hexanoyl, heptanoyl, octanoyl, and branched chain isomers of the foregoing.

The compounds of this invention can be conveniently prepared from progesterone through the intermediate compound pregnane-4,5-diol-3,20-dione, originally described by Butenandt and Wolz Berichte der Deutschen Chemischen Gesellschaft, 71, 1486 (1938). In the method of Butenandt and Wolz, pregnane-4,5-diol-3,20-dione is prepared by the dihydroxylation of progesterone with hydrogen peroxide and osmium tetroxide in ether solution. It has now been found that improvements in the quality and yield of the reaction product are achieved by conducting the dihydroxylation of progesterone with hydrogen peroxide and osmium tetroxide using tert.-butanol as a reaction solvent, as described in greater detail in the pertinent example.

It has also been discovered that pregnane-4,5-diol-3,20-dione can be prepared from progesterone by an entirely different method which avoids the use of the expensive osmium tetroxide. In this procedure a solution of progesterone in a lower alkanol such as 95% ethanol is treated with aqueous hydrogen peroxide and the reaction mixture is subjected to irradiation with ultraviolet light. By this procedure hydroxyl groups are added to the 4,5-double bond without the use of osmium tetroxide.

We have found that 4-hydroxyprogesterone can be obtained by subjecting pregnane-4,5-diol-3,20-dione to one of a variety of dehydrating media, whereby only the hydroxyl group attached to the 5-position is lost by dehydration. Among the reaction media which we have found to be suitable in effecting the dehydration of pregnane-4,5-diol-3,20-dione to 4-hydroxyprogesterone are concentrated sulfuric acid, glacial acetic acid, a mixture of glacial acetic acid and acetic anhydride, a mixture of glacial acetic acid and p-toluenesulfonic acid, a mixture of p-toluenesulfonic acid in a hydrocarbon solvent such as toluene, formic acid, and a mixture of glacial acetic acid and concentrated hydrochloric acid. In carrying out the dehydration with concentrated sulfuric acid, we prefer to conduct the reaction at room temperature for about 20-24 hours, in order to avoid the excessive side reactions that occur at elevated temperatures with this reagent. In carrying out the dehydration reaction with the other reaction systems described, satisfactory results are obtained by operating at higher temperatures.

4-hydroxyprogesterone obtained by these procedures is identical with that obtained by the hydrolysis of 4,5-epoxy-3,20-pregnanedione, as described in the co-pending application of Roy H. Bible, Jr. and Chester Placek, Serial No. 424,521, filed April 20, 1954, now abandoned.

The hydroxyl group of 4-hydroxyprogesterone is esterified by treatment of this compound with anhydrides of lower alkanoic acids. The compounds thus obtained are 4-acyloxyprogesterones.

The compounds of this invention are valuable for their hormonal properties. In particular the claimed compounds are useful as agents for androgen therapy. They are also potent ovulation inhibitors, effective after either subcutaneous or oral administration.

The following examples are set forth by way of illustration only and it will be understood that the invention is not to be construed as limited in spirit or in scope by the details contained therein. It will be apparent to those skilled in the art that many modifications in materials and methods can be made without departing from the scope of the invention. In these examples temperatures are given in degrees centigrade, quantities of materials in parts by weight, and pressures in millimeters (mm.) of mercury.

Example 1

A stirred solution of 5 parts of progesterone and 7.12 parts of 30% hydrogen peroxide in 320 parts of 95% ethanol is irradiated for 4 hours with ultraviolet light from a source placed 15 centimeters above the surface of the reaction mixture. The irradiation maintains the solution somewhat warmer than room temperature, typically at about 40° C. At the end of the reaction period, the mixture is concentrated to dryness and the residue, dissolved in ethyl acetate, is partitioned into neutral and acidic fractions with 4% sodium bicarbonate solution. The neutral fraction, consisting of about 4.8 parts of syrup, is dissolved in 90 parts of a 5 volume percent solution of ethyl acetate in benzene and poured on a chromatography column prepared from 250 parts of silica. By elution of the column with mixtures of ethyl acetate and benzene containing from 6 to 12 volume percent of ethyl acetate, there is obtained a crystallizate of pregnane-4,5-diol-3,20-dione. By repeated recrystallization from methylene chloride the purified compound, melting point about 258-259° C., is obtained. This material has a specific rotation of +106° in methylene chloride solution. It has the structural formula

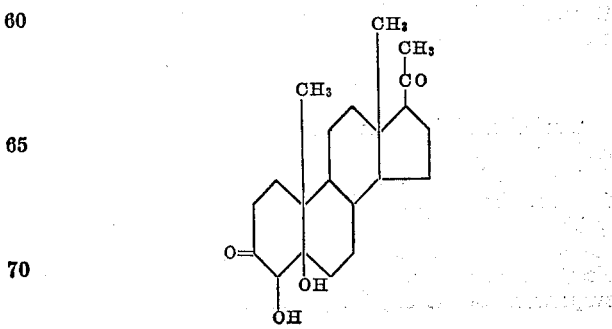

The 4,5-diacetate of this compound, prepared by allowing a solution of the free diol, p-toluenesulfonic acid and acetic anhydride to stand at room temperature for 20 hours, melts at 158–160° C. and exhibits a specific rotation of +89° in acetone solution.

Example 2

A mixture of 1 part of pregnane-4,5-diol-3,20-dione and 200 parts of concentrated sulfuric acid is allowed to stand at room temperature for 21 hours. The mixture is poured onto ice and the resulting suspension of precipitated solid is extracted with ethyl acetate. The extract is washed with aqueous sodium bicarbonate solution and with water and is then concentrated to a residual syrup. Repeated recrystallization of this residue from methanol yields 4-hydroxyprogesterone melting at 238–239° C., with sublimation. This compound has a specific rotation of +184° in chloroform solution and exhibits an ultraviolet absorption maximum at 277–278 millimicrons with a molecular extinction coefficient of 11,700. Infrared absorption maxima appear at 2.95, 5.88, 5.98, and 6.12 microns. In concentrated sulfuric acid an ultraviolet absorption maximum appears at 323 millimicrons. The presence of an enolic hydroxyl group is further demonstrated by the deep blue-green coloration produced with ferric chloride solution. This compound has the following structural formula

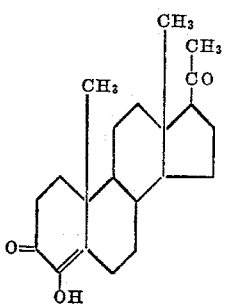

Example 3

A mixture of 6 parts of pregnane-4,5-diol-3,20-dione and 2000 parts of glacial acetic acid is heated under reflux for 5 hours and is then concentrated to dryness. A solution of the residue in ethyl acetate is washed with dilute sodium bicarbonate solution and with water. The residue obtained by concentration of the organic phase is crystallized from ethyl acetate to yield 4-hydroxyprogesterone, identical with the product of Example 2.

Example 4

A solution of 2.5 parts of pregnane-4,5-diol-3,20-dione, 525 parts of glacial acetic acid and 25 parts of acetic anhydride is heated under reflux for 4 hours and then concentrated to dryness. A solution of the residue in ethyl acetate is washed with dilute sodium bicarbonate solution and with water and concentrated to dryness. Recrystallization of the residue yields 4-hydroxyprogesterone, identical with the product of Example 2.

Example 5

A solution of 5.1 parts of pregnane-4,5-diol-3,20-dione and 6.4 parts of p-toluenesulfonic acid monohydrate in 4200 parts of glacial acetic acid is heated under reflux for 5 hours. Evaporation of the reaction mixture yields a residue, which is dissolved in ethyl acetate and partitioned into neutral and acidic fractions by extraction with sodium bicarbonate solution. The neutral fraction, obtained by evaporation of the organic phase, is recrystallized from ethyl acetate to yield 4-hydroxyprogesterone, identical with the product of Example 2.

Example 6

A solution prepared from 6 parts of pregnane-4,5-diol-3,20-dione, 5.4 parts of p-toluenesulfonic acid and 11,000 parts of toluene is heated under reflux for 2 hours. The reaction mixture is cooled to room temperature, washed with dilute sodium bicarbonate solution and with water, and concentrated to dryness. Recrystallization of the residue from ethyl acetate yields 4-hydroxyprogesterone, identical with the product of Example 2.

Example 7

A solution of 5.3 parts of pregnane-4,5-diol-3,20-dione in 6000 parts of 87% formic acid is heated for 30 minutes under partial reflux, in such a manner that about 2400 parts of distillate are collected. This distillate is discarded, and the remaining solution is heated under total reflux for an additional 30 minutes. The reaction mixture is concentrated to dryness in a vacuum and the residue in ethyl acetate solution is partitioned into neutral and acidic fractions by washing the organic phase with sodium bicarbonate solution. The residue deposited by evaporation of the ethyl acetate solution yields, after recrystallization from ethyl acetate, 4-hydroxyprogesterone. This product is identical with that obtained in Example 2.

Example 8

A solution of 5.153 parts of progesterone in 110 parts of tert.-butanol is treated by the addition of 13.9 parts of 30% hydrogen peroxide and 0.301 part of osmium tetroxide and is allowed to stand in a nitrogen atmosphere at room temperature for 44 hours. A solid product, pregnane-4,5-diol-3,20-dione, identical with the product of Example 1, crystallizes from the mixture during the course of the reaction period. This product is collected and washed with 40 parts of tert.-butanol. An additional quantity of pregnane-4,5-diol-3,20-dione can be obtained by concentration of the alcoholic liquors.

Example 9

A suspension of 1.45 parts of pregnane-4,5-diol-3,20-dione in 260 parts of glacial acetic acid and 4.8 parts of concentrated hydrochloric acid is maintained at 70–75° C. in a nitrogen atmosphere for 2½ hours. A clear solution results within the first hour of reaction time. The solution is concentrated to dryness in a vacuum and the residue is dissolved in 270 parts of ethyl acetate. This solution is washed with 4% sodium bicarbonate solution and with water. The residue deposited by evaporation of the ethyl acetate solution is recrystallized from mixtures of methanol and methylene chloride to yield 4-hydroxyprogesterone, identical with the product of Example 2. This compound can also be purified by sublimation, by heating it at 0.004 mm. pressure at a bath temperature of about 170–195° C.

Example 10

A solution of 1 part of 4-hydroxyprogesterone in 200 parts of acetic anhydride is heated under reflux for 1 hour and is then concentrated to dryness in a vacuum. The residue in ethyl acetate solution is partitioned into neutral and acidic fractions by extraction with dilute sodium bicarbonate solution. The ethyl acetate solution is washed with water and evaporated to dryness, yielding a residue of the neutral fraction. Repeated recrystallization from petroleum ether yields purified 4-acetoxyprogesterone melting at 167–168.5° C. This compound has a specific rotation of +133° in acetone solution and an ultraviolet absorption maximum at 245 millimicrons with a molecular extinction coefficient of 12,200. Infrared absorption maxima appear at 5.69, 5.91, 6.12, 8.20 and 8.29 microns. This compound has the structural formula

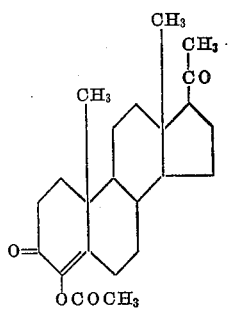

*Example 11*

By the procedure of Example 10, with the substitution of propionic anhydride for acetic anhydride, 4-propionoxyprogesterone is obtained.

*Example 12*

A solution of 2.5 parts of 4-hydroxyprogesterone in 300 parts of valeric anhydride is heated on a steam bath for 4 hours in a nitrogen atmosphere and is then concentrated to dryness in a vacuum. A solution of the residue in ethyl acetate is washed with dilute sodium bicarbonate solution and with water and is then evaporate to dryness. Repeated recrystallization of the residue from mixtures of ethyl acetate and petroleum ether yields 4-valeryloxyprogesterone.

What is claimed is:

1. A compound represented by the formula

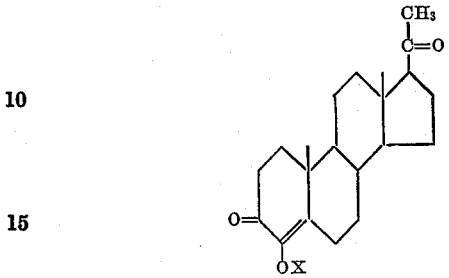

where X is a member selected from the group consisting of hydrogen and acyl radicals derived from lower alkanoic acids.

2. 4-hydroxyprogesterone.
3. 4-acetoxyprogesterone.

References Cited in the file of this patent
UNITED STATES PATENTS

| | | |
|---|---|---|
| 2,341,081 | Butenandt | Feb. 8, 1944 |
| 2,437,564 | Serini et al. | Mar. 9, 1948 |